United States Patent
K et al.

(10) Patent No.: US 11,368,381 B2
(45) Date of Patent: Jun. 21, 2022

(54) OPTIMIZING TUNNEL MONITORING IN SDN

(71) Applicant: Telefonaktiebolaget LM Ericsson (publ), Stockholm (SE)

(72) Inventors: Faseela K, Bangalore (IN); Vyshakh Krishnan C H, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 300 days.

(21) Appl. No.: 16/488,405

(22) PCT Filed: Mar. 8, 2017

(86) PCT No.: PCT/IB2017/051366
§ 371 (c)(1),
(2) Date: Aug. 23, 2019

(87) PCT Pub. No.: WO2018/162953
PCT Pub. Date: Sep. 13, 2018

(65) Prior Publication Data
US 2020/0067809 A1    Feb. 27, 2020

(51) Int. Cl.
*H04L 43/10*   (2022.01)
*H04L 43/026*   (2022.01)
(Continued)

(52) U.S. Cl.
CPC .......... *H04L 43/10* (2013.01); *H04L 43/026* (2013.01); *H04L 43/0811* (2013.01); *H04L 43/16* (2013.01)

(58) Field of Classification Search
CPC ... H04L 43/10; H04L 43/026; H04L 43/0811; H04L 43/16
See application file for complete search history.

(56) References Cited

U.S. PATENT DOCUMENTS 9,602,398 B2    3/2017 Pettit et al.
2017/0041209 A1*   2/2017 Joshi .................. H04L 45/38
2017/0142034 A1    5/2017 K et al.

FOREIGN PATENT DOCUMENTS

WO    2015166506 A1    11/2015
WO    2016018181 A1    2/2016
(Continued)

OTHER PUBLICATIONS

Open Networking Foundation, "OpenFlow Switch Specification," Version 1.5.1 (Protocol version 0x06), ONF TS-025, Mar. 26, 2015, pp. 1-283. (Year: 2015).*

(Continued)

*Primary Examiner* — Siming Liu
(74) *Attorney, Agent, or Firm* — Sage Patent Group

(57) ABSTRACT

A method implemented by a first switch in a software defined networking (SDN) network to monitor a tunnel between the first switch and a second switch in the SDN network. The method includes generating a first flow entry that matches packets received over the tunnel, generating a second flow entry that matches packet received over the tunnel, where the second flow entry has a priority that is lower than a priority of the first flow entry, removing the first flow entry and transmitting a flow removed message to an SDN controller in response to a determination that the first flow entry has timed out, maintaining a statistic associated with the second flow entry, and transmitting a statistics trigger event message to the SDN controller in response to a determination that the statistic associated with the second flow entry exceeds a threshold value.

16 Claims, 9 Drawing Sheets

(51) Int. Cl.
  *H04L 43/0811* (2022.01)
  *H04L 43/16* (2022.01)

(56) References Cited

FOREIGN PATENT DOCUMENTS

| WO | 2017021889 A1 | 2/2017 |
| WO | 2018220638 A1 | 12/2018 |

OTHER PUBLICATIONS

McKeown, N., "Software-defined Networking," IEEE Infocon, Apr. 19-25, 2009, downloaded from https://www.es.odu.edu/~cs752/papers/sdr-infocom_brazil_2009_v1-1.pdf on Aug. 12, 2019, 64 pages.

Open vSwitch Manual, Open vSwitch 2.3.90, DB Schema 7.10.1, ovs-vswitchd.conf.db(5), Sep. 14, 2011, downloaded from http://www.openvswitch.org//ovs-vswitchd.conf.db.5.pdf on Aug. 12, 2019, 58 pages.

Open Networking Foundation, "OpenFlow Switch Specification," Version 1.5.0 (Protocol version 0x06), ONF TS-020, Dec. 19, 2014, pp. 1-277.

Open Networking Foundation, "OpenFlow Switch Specification," Version 1.5.1 (Protocol version 0x06), ONF TS-025, Mar. 26, 2015, pp. 1-283.

\* cited by examiner

OPTIMIZING TUNNEL MONITORING IN SDN

CROSS-REFERENCE TO RELATED APPLICATIONS

This application is a national stage of International Application No. PCT/IB2017/051366, filed Mar. 8, 2017, which is hereby incorporated by reference.

TECHNICAL FIELD

Embodiments of the invention relate to the field of computer networks, and more specifically, to optimizing tunnel monitoring in software defined networking (SDN) networks.

BACKGROUND

Software defined networking (SDN) is an approach to computer networking that employs a split architecture network in which the forwarding plane (sometimes referred to as the data plane) is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

OpenFlow is a protocol that enables controllers and switches in an SDN network to communicate with each other. OpenFlow enables dynamic programming of flow control policies in the network. An OpenFlow switch includes a programmable packet processing pipeline (sometimes referred to as the OpenFlow pipeline). The OpenFlow pipeline includes one or more flow tables, where each flow table includes one or more flow entries. The flow tables of an OpenFlow pipeline are sequentially numbered, starting from zero. Pipeline processing starts at the first flow table (e.g., flow table 0). When processed by a flow table, a packet is matched against the flow entries of the flow table to select a flow entry. If a flow entry is found, the instruction set included in that flow entry is executed.

The forwarding plane in an SDN network typically includes one or more switches that are connected to each other via a full mesh of tunnels. The tunnels are typically implemented using technologies such as Virtual eXtensible Local Area Network (VxLAN), Generic Routing Encapsulation (GRE), Multiprotocol Label Switching (MPLS), or similar tunneling technology. To create a full mesh of tunnels for a group of n switches, $(n*(n-1))/2$ tunnels are needed. Each switch will have $(n-1)$ tunnel end points, one for each tunnel towards the other switches. Service connectivity applications such as Service Chain Function (SCF), Ethernet Local Area Network (e-LAN), and Layer 3 Virtual Private Network (L3VPN) can utilize these tunnels to send traffic.

The tunnels in the SDN network need to be monitored in order to avoid prolonged service disruptions. One conventional technique to monitor a tunnel is for the SDN controller to generate a special packet and insert the special packet into one end point of the tunnel. Once the special packet reaches the other end point of the tunnel, the special packet can be encapsulated and sent to the SDN controller. The SDN controller can compare the number of special packets that were sent with the number of special packets that were received to determine the health of the tunnel. If the health of the tunnel is deemed to be poor, the SDN controller can take appropriate actions to restore the health of the tunnel.

Another conventional technique to monitor a tunnel is for the switches to run protocols such as Bi-directional Forwarding Detection (BFD) and Link Layer Discovery Protocol (LLDP), and rely on the protocol state machine to detect failures. With BFD, the switches periodically exchange BFD keep-alive packets with each other. As long as a switch receives a keep-alive packet from its peer switch, the switch assumes that the tunnel between the switches is operational. If a switch fails to receive a certain number of keep-alive packets from its peer switch within a specific period of time (e.g., at least 3 keep-alive packets within 10 milliseconds), then the switch assumes that the tunnel between the switches has failed, and may take corrective action.

The conventional tunnel monitoring techniques described above rely on injecting explicit tunnel monitoring packets into a tunnel. For example, BFD periodically sends bidirectional keep-alive packets over a tunnel. These bidirectional keep-alive packets are sent even when the tunnel is carrying normal data traffic. As such, these keep-alive packets unnecessarily consume tunnel bandwidth. For example, for a BFD session with a keep-alive interval of 3 milliseconds, around 333 keep-alive packets are sent per second, where the size of each keep-alive packet ranges from around 80 to 110 bytes. Thus, around 66 kilobytes per second of the tunnel bandwidth is used for tunnel monitoring purposes. Also, processing the keep-alive packets and updating the protocol state machine consumes valuable processing resources at the switches, which can result in reduced packet processing speed and even packet loss.

SUMMARY

A method is implemented by a first switch in a software defined networking (SDN) network to monitor a tunnel between the first switch and a second switch in the SDN network. The method includes generating a first flow entry that matches packets received over the tunnel, generating a second flow entry that matches packet received over the tunnel, where the second flow entry has a priority that is lower than a priority of the first flow entry, removing the first flow entry and transmitting a flow removed message to an SDN controller in response to a determination that the first flow entry has timed out, maintaining a statistic associated with the second flow entry, and transmitting a statistics trigger event message to the SDN controller in response to a determination that the statistic associated with the second flow entry exceeds a threshold value.

A network device is configured to function as a first switch in a software defined networking (SDN) network to monitor a tunnel between the first switch and a second switch in the SDN network. The network device includes a set of one or more processors and a non-transitory machine-readable storage medium having stored therein a tunnel monitoring component. The tunnel monitoring component, when executed by the set of one or more processors, causes the network device to generate a first flow entry that matches packets received over the tunnel, generate a second flow entry that matches packet received over the tunnel, wherein the second flow entry has a priority that is lower than a priority of the first flow entry, remove the first flow entry and transmit a flow removed message to an SDN controller in response to a determination that the first flow entry has timed out, maintain a statistic associated with the second flow entry, and transmit a statistics trigger event message to the SDN controller in response to a determination that the statistic associated with the second flow entry exceeds a threshold value.

A non-transitory machine-readable medium has computer code stored therein, which when executed by a set of one or more processors of a network device functioning as a first switch in a software defined networking (SDN) network, causes the network device to perform operations for monitoring a tunnel between the first switch and a second switch in the SDN network. The operations include generating a first flow entry that matches packets received over the tunnel, generating a second flow entry that matches packet received over the tunnel, where the second flow entry has a priority that is lower than a priority of the first flow entry, removing the first flow entry and transmitting a flow removed message to an SDN controller in response to a determination that the first flow entry has timed out, maintaining a statistic associated with the second flow entry, and transmitting a statistics trigger event message to the SDN controller in response to a determination that the statistic associated with the second flow entry exceeds a threshold value.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
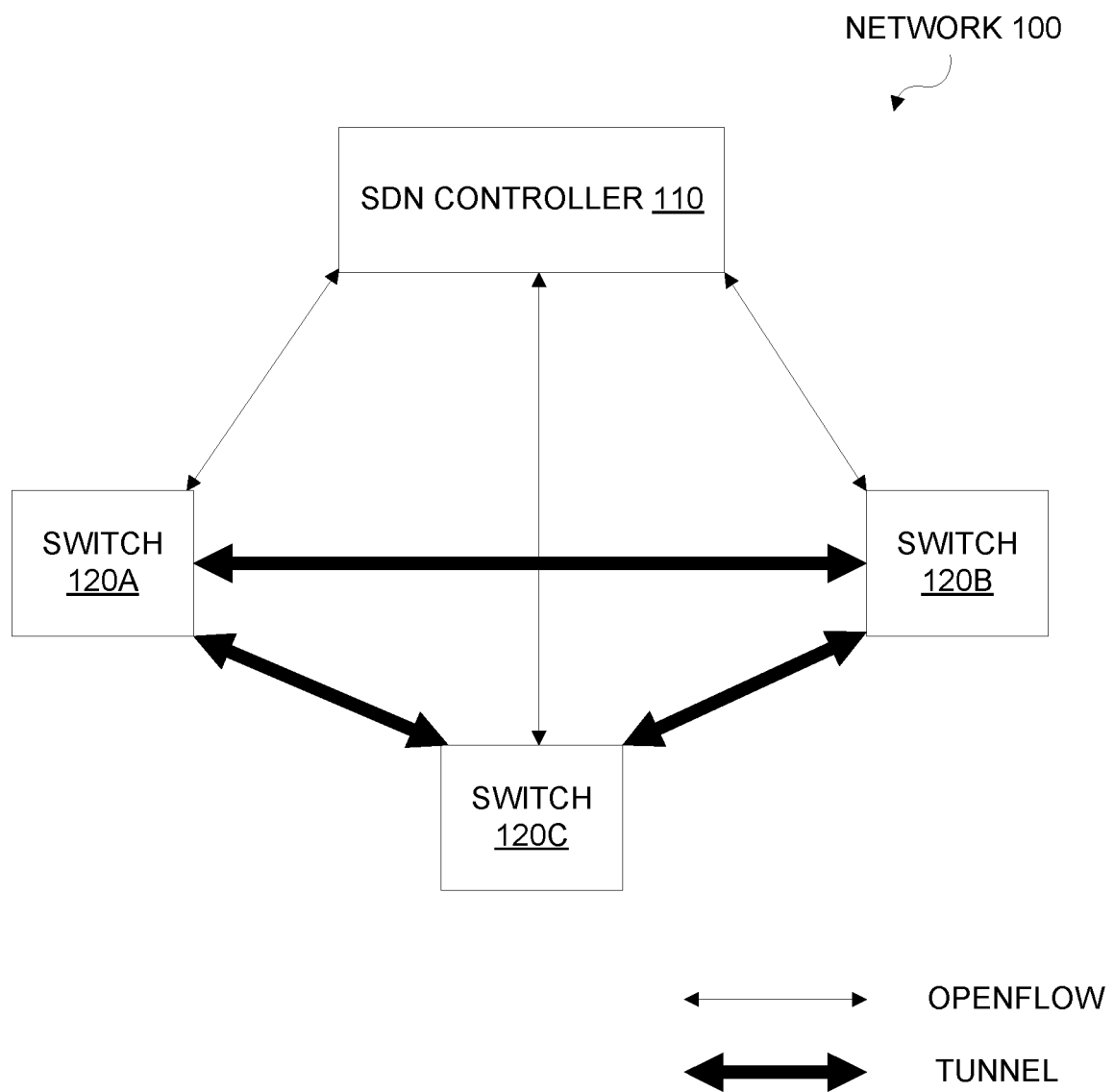
FIG. 1 is a block diagram of an SDN network in which tunnel monitoring can be implemented, according to some embodiments.

The following description describes methods and apparatus for monitoring a tunnel in a software defined networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram of an SDN network in which tunnel monitoring can be implemented, according to some embodiments. The SDN network 100 includes an SDN controller 110 that is communicatively coupled to switches 120 (e.g., switches 120A-C). In one embodiment, the SDN controller 110 and the switches 120 communicate using a southbound communications protocol such as OpenFlow (e.g., OpenFlow 1.5) or similar southbound protocol. The SDN controller 110 may use OpenFlow or a similar southbound protocol to configure and manage the forwarding behavior of the switches 120. For clarity and ease of understanding, embodiments are primarily described in a context where OpenFlow is used as the southbound communication protocol between the SDN controller 110 and the switches 120. However, it should be understood that the SDN controller 110 and the switches 120 can communicate using other types of southbound communication protocols and that the tunnel monitoring techniques disclosed herein can be implemented in a context where the SDN controller 110 and the switches 120 use other types of southbound communications protocols without departing from the spirit and scope of the present disclosure. For sake of illustration the SDN network 100 is shown as including a single SDN controller 110 that manages three switches 120. However, it should be understood that the SDN network 100 can include more than one SDN controller 110 and that each SDN controller 110 can manage more or less than three switches 120.

Each switch 120 may include a packet processing pipeline that includes a set of flow tables. Each flow table may include a set of flow entries, where each flow entry includes a packet matching criteria (e.g., carried in a match field) and a corresponding set of instructions to execute when a packet matches the packet matching criteria. A packet is said to match a flow entry if the packet matches the packet matching criteria of the flow entry. In one embodiment, when a switch 120 receives a packet in the data plane, the switch 120 initially matches the packet against flow entries in the foremost flow table of the packet processing pipeline. The switch 120 may then continue to match the packet against flow entries in subsequent flow tables of the packet processing pipeline. If the packet matches a flow entry, then the switch 120 executes the corresponding set of instructions of that flow entry. In one embodiment, flow entries are assigned a priority. If the packet matches the packet matching criteria of multiple flow entries within a flow table, only the flow entry having the highest priority is selected (and its instructions to executed). The set of instructions specified in a flow entry may include, for example, instructions to modify the packet, direct the packet to another flow table in the packet processing pipeline, and/or output the packet to a specified port.

In one embodiment, the switches 120 are connected to each other via a full mesh of tunnels. The tunnels may be implemented using technologies such as VxLAN, GRE, MPLS, or similar tunneling technology. To create a full mesh of tunnels for a group of n switches 120, $(n*(n-1))/2$ tunnels are needed. Each switch will have (n−1) tunnel end points, one for each tunnel towards the other switches 120. Service connectivity applications such as Service Chain Function (SCF), Ethernet Local Area Network (e-LAN), and Layer 3 Virtual Private Network (L3VPN) can utilize these tunnels to send traffic.

The tunnels in the SDN network 100 need to be monitored in order to avoid prolonged service disruptions. Conventional tunnel monitoring techniques typically rely on injecting explicit tunnel monitoring packets into a tunnel. As used herein, explicit tunnel monitoring refers to a tunnel monitoring technique where packets are injected into a tunnel, where the sole or primary purpose of these packets is to monitor the tunnel (and not for carrying user data). For example, BFD periodically sends bidirectional keep-alive messages over a tunnel. These bidirectional keep-alive messages are sent even when the tunnel is carrying normal data traffic. As such, these keep-alive messages unnecessarily consume tunnel bandwidth. For example, for a BFD session with a keep-alive interval of 3 milliseconds, around 333 keep-alive messages are sent per second, where the size of each keep-alive message ranges from around 80 to 110 bytes. Thus, around 66 kilobytes per second of the tunnel bandwidth is used for tunnel monitoring purposes. Also, processing the keep-alive messages and updating the protocol state machine consumes valuable processing resources at the switches 120, which can result in reduced packet processing speed and even packet loss.

Embodiments disclosed herein overcome some of the disadvantages of the conventional techniques by using the existing traffic flowing through a tunnel to determine whether the tunnel is operational and by only resorting to explicit tunnel monitoring techniques (e.g., that inject explicit tunnel monitoring packets into the tunnel) when there is no traffic flowing through the tunnel for a period of time. This is based on the observation that when traffic is flowing through the tunnel, there is no need to inject explicit tunnel monitoring packets into the tunnel since it can be inferred from the existing traffic flowing through the tunnel that the tunnel is operational. As will be described in additional detail below, embodiments may achieve this by programming a particular set of flow entries in the switches 120 at the end points of the tunnel. As will become apparent from the disclosure provided herein, an advantage of the embodiments disclosed herein is that they only resort to explicit tunnel monitoring when there is no traffic flowing through the tunnel, and thus the bandwidth usage of the tunnel and the processing load at the end points of the tunnel (e.g., the switches 120) can be reduced.

Figure 2:
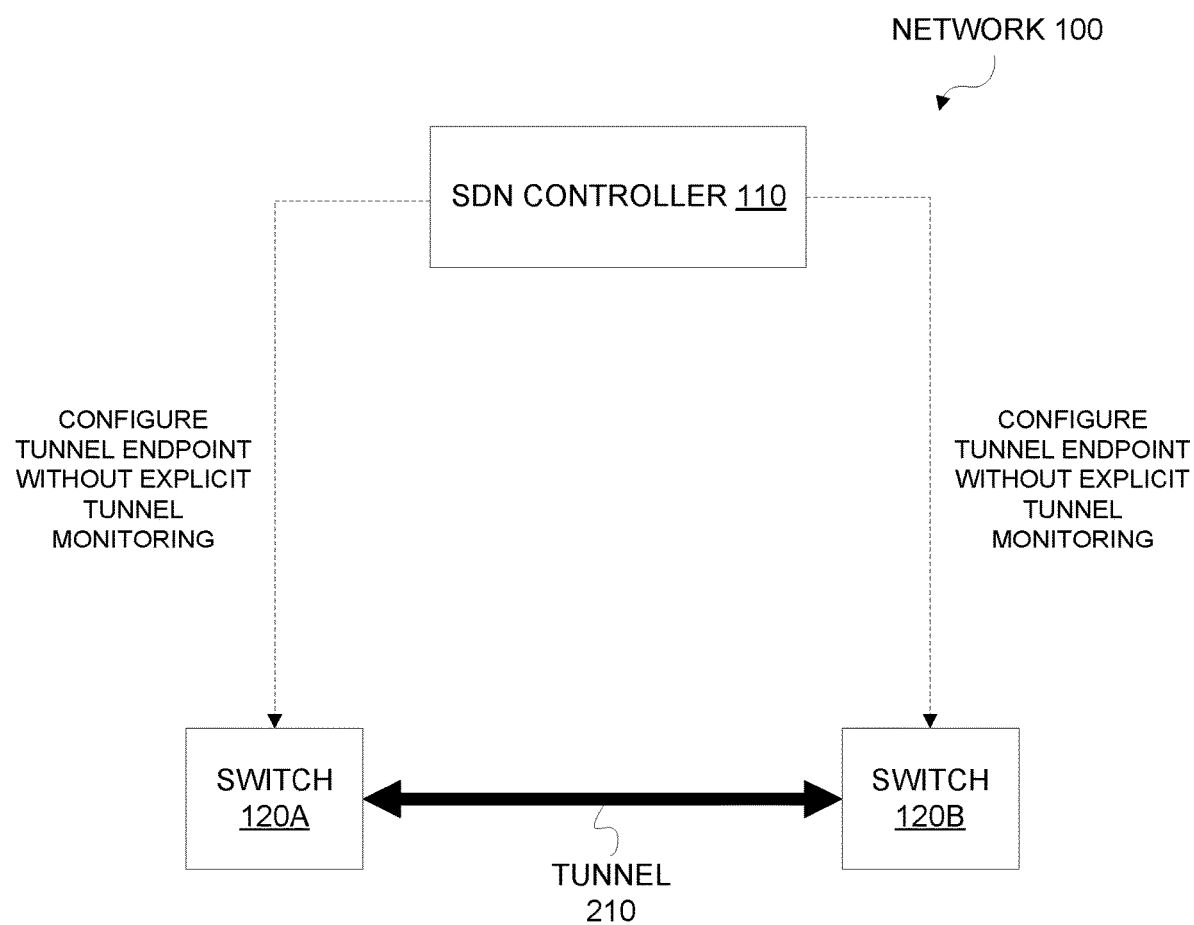
FIG. 2 is a diagram illustrating operations by an SDN controller to configure a tunnel between two switches, according to some embodiments.

FIG. 2 is a diagram illustrating operations by an SDN controller to configure a tunnel between two switches, according to some embodiments. As shown in the diagram, SDN controller 110 may program switch 120A and switch 120B to configure tunnel 210 between switch 120A and switch 120B. In one embodiment, explicit tunnel monitoring is initially disabled for tunnel 210. In one embodiment, SDN controller 110 programs a particular set of flow entries in switch 120B to configure and monitor tunnel 210. These flow entries may include a failure detect flow entry to detect when tunnel 210 has potentially failed and a recovery detect flow entry to detect when tunnel 210 has potentially recovered from failure. For sake of illustration, embodiments will primarily be described with regard to the flow entries programmed switch 120B. However, it should be understood that similar flow entries can be programmed in switch 120A to configure and monitor tunnel 210. The failure detect flow entry and the recovery detect flow entry are described in further detail herein below.

The failure detect flow entry detects when the tunnel 210 has potentially failed. In one embodiment, the failure detect flow entry includes a packet matching criteria that matches packets that are received over a tunnel 210 and an instruction to forward matching packets to the tunnel processing pipeline (for normal tunnel processing). In one embodiment, the SDN controller 110 programs the failure detect flow entry with a soft timeout such that the failure detect flow entry times out if no packets match the failure detect flow entry for a specified period of time (e.g., equal to or slightly less than the explicit tunnel monitoring interval). In one embodiment, if the failure detect flow entry times out, the switch 120 removes the failure detect flow entry and transmits a message to the SDN controller 110 indicating that the failure detect flow entry has been removed (this message may be referred to herein as a flow removed message).

An example of a failure detect flow entry is shown in Table I.

TABLE I

| PACKET MATCHING CRITERIA | PRIORITY | IDLE TIMEOUT | INSTRUCTIONS |
|---|---|---|---|
| TUNNEL PORT, LOCAL IP, REMOTE IP | 50 | 1 SEC | FORWARD TO TUNNEL PROCESSING PIPELINE |

The packet matching criteria of this failure detect flow entry is set to match packets received over a specific tunnel 210 (identified by tunnel port, local Internet Protocol (IP) address, and remote IP address). The priority of the failure detect flow entry is set to 50. The idle timeout of the failure detect flow entry is set to 1 second so that the failure detect flow entry times out if no packets match the failure detect flow entry for 1 second. The instructions of the failure detect flow entry include an instruction to forward matching packets to the tunnel processing pipeline.

Figure 3:
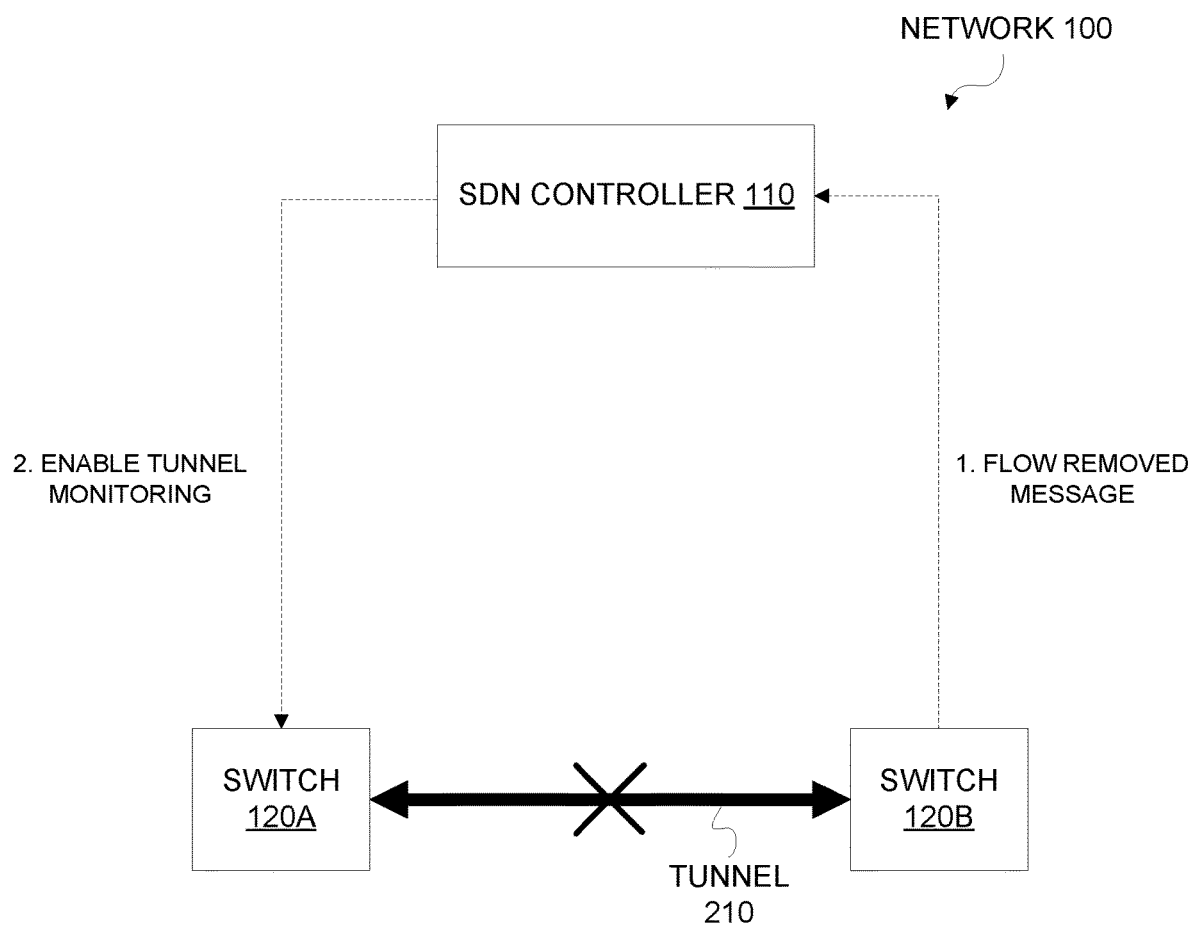
FIG. 3 is a diagram illustrating operations by a switch and an SDN controller when a failure detect flow entry times out, according to some embodiments.

FIG. 3 is a diagram illustrating operations by a switch and an SDN controller when a failure detect flow entry times out, according to some embodiments. When tunnel 210 is operational, the packets transmitted by switch 120A over tunnel 210 will reach switch 120B and match the failure detect flow entry in switch 120B. As a result, the packets will be forwarded to the tunnel processing pipeline, and be processed accordingly. However, as shown in FIG. 3, when tunnel 210 fails (e.g. due to a path failure), the packets transmitted by switch 120A over tunnel 210 will not reach switch 120B. In this case, if tunnel 210 does not recover within a specified period of time, the failure detect flow entry times out. This results in switch 120B removing the failure detect flow entry and transmitting a flow removed message to SDN controller 110 (operation 1). Based on receiving the flow removed message, SDN controller 110 may determine that no traffic has been flowing through tunnel 210 for at least the specified period of time. In response, the SDN controller 110 may enable explicit tunnel monitoring for tunnel 210 to determine whether tunnel 210 has failed or if there is just an absence of traffic flowing through tunnel 210 (operation 2).

It should be noted that when the failure detect flow entry times out, it can indicate either (1) the tunnel 210 is operational but there is no traffic flowing through the tunnel 210 or (2) the tunnel 210 has failed. When the failure detect flow entry times out, explicit tunnel monitoring can be used to confirm the reason for flow entry timing out. In the case that the failure detect flow entry timed out due to no traffic flowing through the tunnel 210, explicit tunnel monitoring can be allowed to continue until some traffic starts flowing through the tunnel 210.

The recovery detect flow entry detects when the tunnel 210 has potentially recovered from failure. In one embodiment, the recovery detect flow entry includes the same packet matching criteria and the same instructions as the failure detect flow entry. That is, the recovery detect flow entry includes a packet matching criteria that matches packets that are received over the tunnel 210 and an instruction to forward matching packets to the tunnel processing pipeline. In one embodiment, the recovery detect flow entry also includes an instruction referred to herein as a statistics trigger instruction (e.g., OFPIT_STAT_TRIGGER instruction in OpenFlow). The statistics trigger instruction instructs the switch 120 to maintain a statistic associated with the recovery detect flow entry and to transmit a message to the SDN controller 110 when the statistic associated with the recovery detect flow entry exceeds a threshold value (this message may be referred to herein as a statistics trigger event message). In one embodiment, the recovery detect flow entry includes an indication of the threshold value. For example, the threshold value may be indicated as a number of packets, in which case the switch 120 keeps track of the number of packets that have matched the recovery detect flow entry (and executed the statistics trigger instruction of the recovery detect flow entry) and transmits a statistics trigger event message to the SDN controller 110 when the number of packets that have matched the recovery detect flow entry exceeds the specified number of packets. As another example, the threshold value may be indicated as a byte count, in which case the switch 120 keeps track of the cumulative byte count of the packets that have matched the recovery detect flow entry (and executed the statistics trigger instruction of the recovery detect flow entry) and transmits a statistics trigger event message to the SDN controller 110 when the cumulative byte count of the packets that have matched the recovery detect flow entry exceeds the specified byte count. In one embodiment, the statistics trigger instruction includes an indication that the statistics trigger event message is to be transmitted to the SDN controller 110 when the statistic associated with the recovery detect flow entry exceeds any multiple of the threshold value (e.g., OSPSTF_PERIODIC flag setting in OpenFlow).

In one embodiment, the recovery detect flow entry has a priority that is lower than the priority of the corresponding failure detect flow entry. As such, when the switch 120 includes both the failure detect flow entry and the recovery detect flow entry, packets received over the tunnel 210 may match the packet matching criteria of both the failure detect flow entry and the recovery detect flow entry, but the switch 120 executes the instructions of the failure detect flow entry since it has higher priority. However, after the failure detect flow entry is removed (e.g., due to the failure detect flow entry timing out), packets received over the tunnel 210 match the recovery detect flow entry and the switch 120 executes the instructions of the recovery detect flow entry (including the statistics trigger instruction).

An example of a recovery detect flow entry (corresponding to the failure detect flow entry shown in Table I) is shown in Table II.

TABLE III

| PACKET MATCHING CRITERIA | PRIORITY | IDLE TIMEOUT | INSTRUCTIONS |
| --- | --- | --- | --- |
| TUNNEL PORT, LOCAL IP, REMOTE IP | 5 | | FORWARD TO TUNNEL PROCESSING PIPELINE; STAT_TRIGGER (THRESHOLDS = 1 PACKET) |

The packet matching criteria of the recovery detect flow entry is set to match packets received over a specific tunnel 210 (identified by tunnel port, local Internet Protocol (IP) address, and remote IP address). This packet matching criteria is typically set to be the same as the packet matching criteria of the corresponding failure detect flow entry. The priority of the recovery detect flow entry is set to 5, which is lower than the priority of the corresponding failure detect flow entry (which was set to 50). The instructions of the recovery detect flow entry include an instruction to forward matching packets to the tunnel processing pipeline. In addition, the instructions include a statistics trigger instruction (STAT_TRIGGER) that instructs the switch 120 to transmit a statistics trigger event message to the SDN controller 110 if at least one packet matches the recovery detect flow entry (THRESHOLD=1 PACKET). In this example, the recovery detect flow entry does not have an idle timeout (it does not time out).

In one embodiment, the statistics trigger instruction uses the following structure and fields:

```
/* Instruction structure for OFPIT_STAT_TRIGGER */
struct ofp_instruction_stat_trigger {
        uint16_t type; /* OFPIT_STAT_TRIGGER */
        uint16_t len; /* Length is padded to 64 bits. */
        uint32_t flags; /* Bitmap of OFPSTF_* flags. */
        struct ofp_stats thresholds; /* Threshold list. Variable size. */
};
OFP_ASSERT(sizeof(struct ofp_instruction_stat_trigger) == 16);
```

The flags field is a bitmap that defines the behavior of the statistics trigger. It may include a combination of the following flags:

```
enum ofp_stat_trigger_flags {
        OFPSTF_PERIODIC = 1 << 0, /* Trigger for all multiples
        of thresholds. */
        OFPSTF_ONLY_FIRST = 1 << 1, /* Trigger on
        only first reach threshold. */
};
```

When the OFPSTF_PERIODIC flag is set, the trigger will apply not only on the values in the thresholds field, but also on all multiples of those values. It allows, for example, to have a trigger every 100 packets for the lifetime of the flow. When the OFPSTF_ONLY_FIRST flag is set, only the first threshold that is crossed is considered, and other thresholds are ignored. This allows the SDN controller 110 to receive only a single statistics trigger event message for multiple thresholds.

Figure 4:
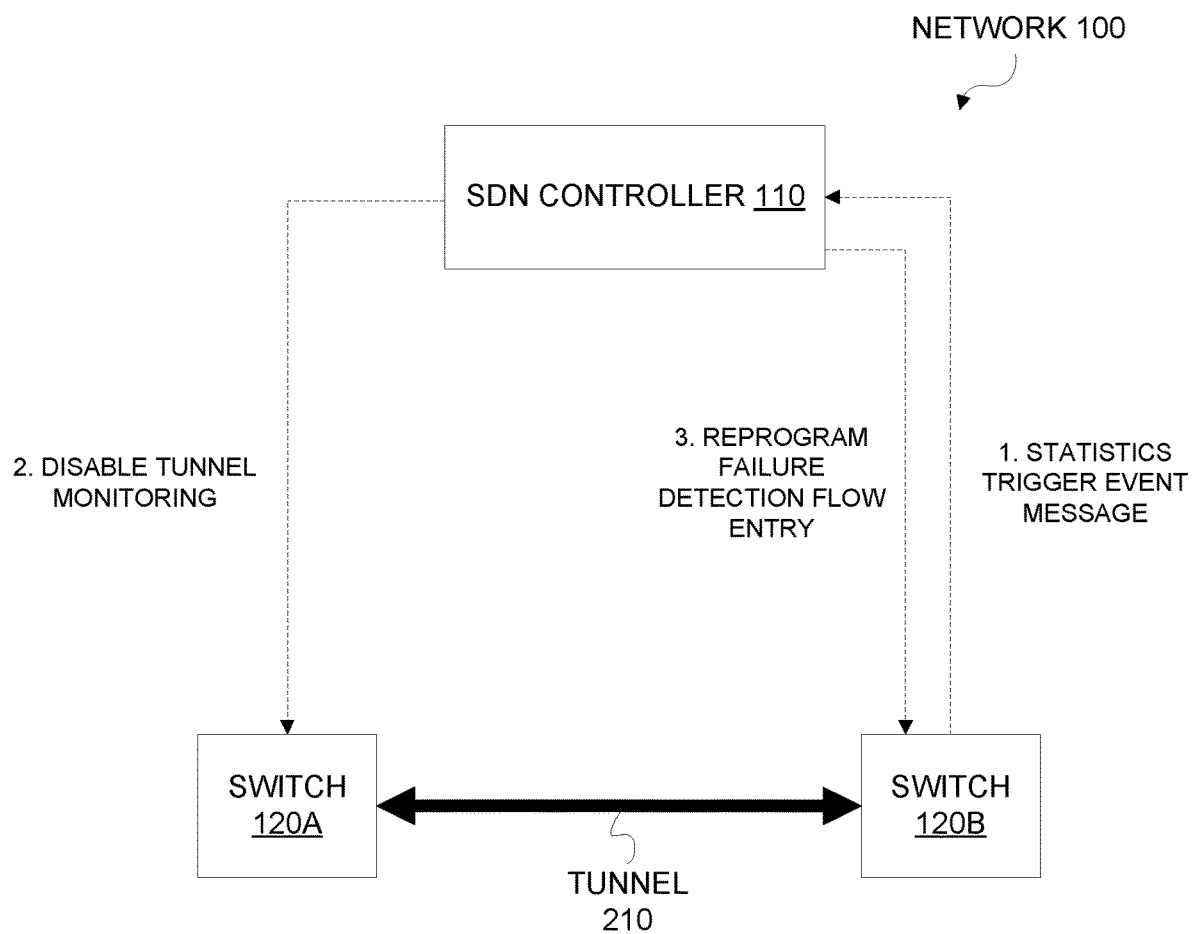
FIG. 4 is a diagram illustrating operations by a switch and an SDN controller when a statistic associated with a recovery detect flow entry exceeds a threshold value, according to some embodiments.

FIG. 4 is a diagram illustrating operations by a switch and an SDN controller when a statistic associated with a recovery detect flow entry exceeds a threshold value, according to some embodiments. Continuing with the example described with reference to FIG. 3, when tunnel 210 recovers from failure and traffic starts flowing through tunnel 210 again, the packets transmitted by switch 120A over tunnel 210 will reach switch 120B and match the recovery detect flow entry in switch 120B (since failure detect flow entry has been removed). As a result, the packets will be forwarded to the tunnel processing pipeline, and be processed accordingly. In addition, as shown in FIG. 4, if the statistic associated with the recovery detect flow entry exceeds the threshold value (or a multiple thereof), switch 120B transmits a statistics trigger event message to SDN controller 110 (operation 1). Based on receiving the statistics trigger event message, SDN controller 110 may determine that traffic is flowing through tunnel 210 again and that 210 tunnel has recovered from failure. In response, SDN controller 110 may disable explicit tunnel monitoring for tunnel 210 (operation 2) and reprogram the failure detection flow entry in switch 120B (to detect future tunnel failures) (operation 3).

In one embodiment, the SDN controller 110 programs a flow entry in the switch 120 to handle explicit tunnel monitoring packets (e.g., BFD keep-alive packets). Such a flow entry may be referred to herein as an explicit tunnel monitoring flow entry. In one embodiment, the explicit tunnel monitoring flow entry includes a packet matching criteria that matches explicit tunnel monitoring packets that are received over the tunnel 210 and an instruction to forward matching packets to the tunnel monitoring pipeline (for normal explicit tunnel monitoring processing). In one embodiment, this flow entry has a priority that is higher than the priority of the recovery detect flow entry so that the explicit tunnel monitoring packets do not trigger a statistics trigger event message (e.g., based on executing the instructions of the recovery detect flow entry).

An example of an explicit tunnel monitoring flow entry is shown in Table III.

TABLE IIIII

| PACKET MATCHING CRITERIA | PRIORITY | IDLE TIMEOUT | INSTRUCTIONS |
|---|---|---|---|
| TUNNEL PORT, LOCAL IP, REMOTE IP, TUNNEL MONITORING PROTOCOL TYPE | 10 | | FORWARD TO TUNNEL MONITORING PIPELINE |

The packet matching criteria of the explicit tunnel monitoring flow entry is set to match packets having an explicit tunnel monitoring protocol type (e.g., BFD packet) received over a specific tunnel 210 (identified by tunnel port, local Internet Protocol (IP) address, and remote IP address). The priority of the explicit tunnel monitoring flow entry is set to 10, which is higher than the priority of the corresponding recovery detect flow entry (shown in Table II). The instructions of the explicit tunnel monitoring flow entry include an instruction to forward matching packets to the tunnel monitoring pipeline. In this example, the explicit tunnel monitoring flow entry does not have an idle timeout (it does not time out).

When explicit tunnel monitoring is enabled for the tunnel 210, the explicit tunnel monitoring packets (e.g., BFD packets) received over the tunnel 210 may match the packet matching criteria of both the explicit tunnel monitoring flow entry and the recovery detect flow entry, but the switch 120 executes the instructions of the explicit tunnel monitoring flow entry since it has higher priority. This allows the switch 120 to handle explicit tunnel monitoring packets without triggering a statistics trigger event message.

Figure 5:
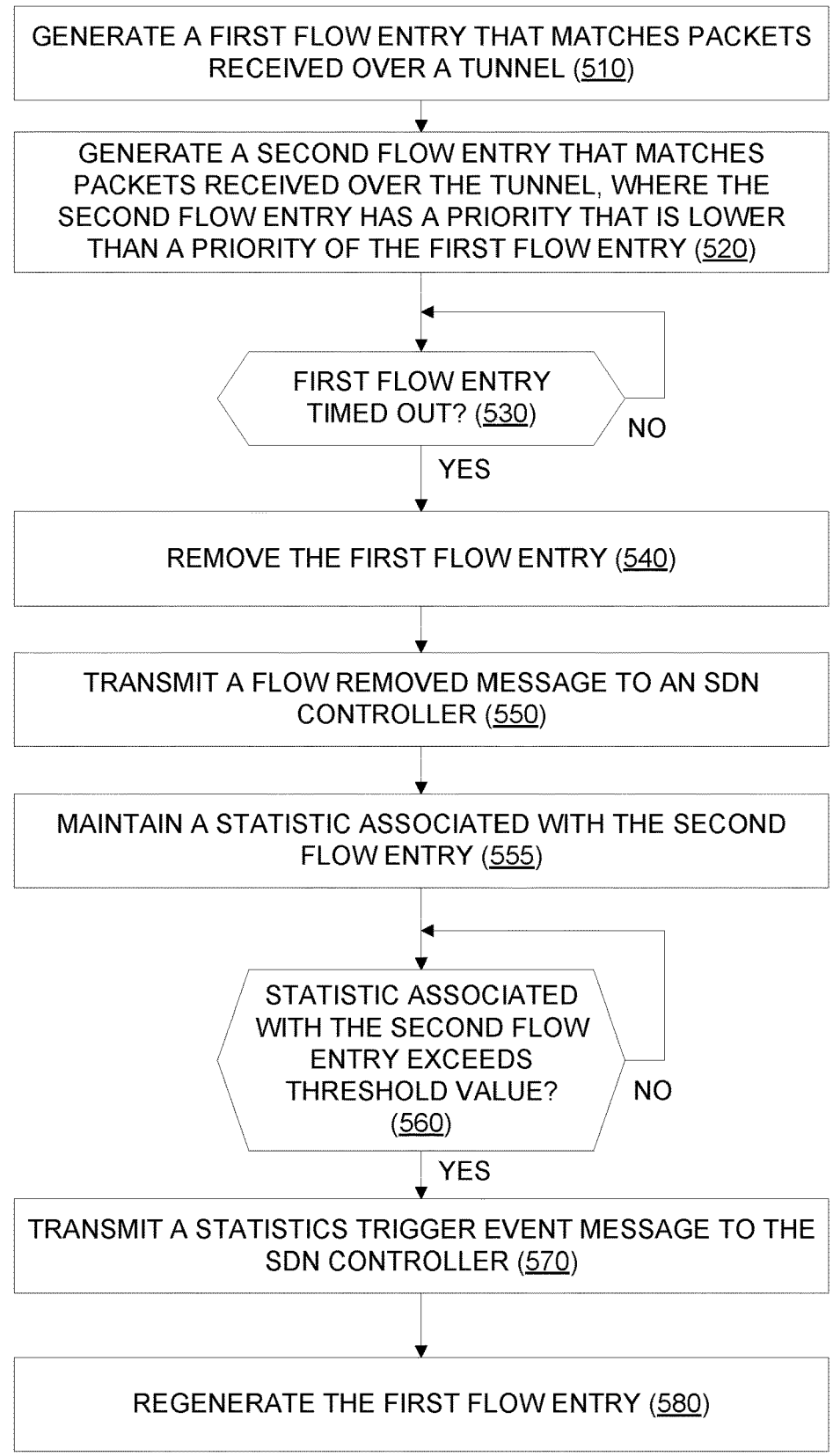
FIG. 5 is a flow diagram of a process for monitoring a tunnel in an SDN network, according to some embodiments.

FIG. 5 is a flow diagram of a process for monitoring a tunnel in an SDN network, according to some embodiments. In one embodiment, the process is performed by a switch 120 in the SDN network 100 (e.g., a network device functioning as a switch 120 in the SDN network 100). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated by the switch 120 generating a first flow entry (e.g., failure detect flow entry) (block 510) and a second flow entry (e.g., recovery detect flow entry) (block 520). Both the first flow entry and the second flow entry may have a packet matching criteria that matches packets received over the tunnel 210, but the second flow entry has a priority that is lower than the priority of the first flow entry. As such, if the switch 120 receives a packet that matches the packet matching criteria of both flow entries, the switch 120 executes the instructions of the first flow entry. In one embodiment, the first flow entry and the second flow entry are generated in a foremost flow table of a packet processing pipeline (e.g., table 0 in OpenFlow). In one embodiment, the first flow entry and the second flow entry include an instruction to direct matching packets to a tunnel processing pipeline. In one embodiment, the first flow entry times out if no packets match the first flow entry for a given period of time. In one embodiment, the first flow entry includes an indication of an idle timeout value (e.g., a value indicating how long it takes for the first flow entry to time out). If the switch 120 determines that the first flow entry has timed out (decision block 530), the switch 120 removes the first flow entry (block 540) and transmits a flow removed message to the SDN controller 110 (block 550) to indicate that the first flow entry has been removed. This may indicate to the SDN controller 110 that the tunnel 210 has potentially failed and cause the SDN controller 110 to enable explicit tunnel monitoring for the tunnel 210. Returning to decision block 530, if the first flow entry has not timed out, the switch 120 continues normal packet processing.

Once the first flow entry has been removed, packets received over the tunnel 210 will match the second flow entry. The switch 120 maintains a statistic associated with the second flow entry (e.g., based on a statistics trigger instruction included in the second flow entry) (block 555). The switch 120 determines whether the statistic associated with the second flow entry exceeds a threshold value (decision block decision block 560). In one embodiment, the statistic associated with the second flow entry is a packet count of packets that matched the second flow entry. In another embodiment, the statistic associated with the second flow entry is a cumulative byte count of packets that matched the second flow entry. In one embodiment, the second flow entry includes an indication of the threshold value. If the statistic associated with the second flow entry has not exceeded the threshold value, the switch 120 continues normal packet processing. If the switch 120 determines that the statistic associated with the second flow entry has exceeded the threshold value, the switch 120 transmits a statistics trigger event message to the SDN controller 110 (block 570). This may indicate to the SDN controller 110 that the tunnel 210 has potentially recovered from failure and cause the SDN controller 110 to disable explicit tunnel monitoring for the tunnel 210. In one embodiment, the second flow entry includes an indication that the statistics trigger event message is to be transmitted to the SDN controller 110 when the statistic associated with the second flow entry exceeds a multiple of the threshold value (e.g., OFPSTF_PERIODIC flag setting in OpenFlow). In this embodiment, the switch 120 transmits a statistics trigger event message to the SDN controller 110 whenever the statistic associated with the second flow entry exceeds a multiple of the threshold value (e.g., every packet or every 10,000 bytes). In one embodiment, after the switch 120 transmits the statistics trigger event message to the SDN controller 110, the switch 120 receives an instruction from the SDN controller 110 to regenerate the first flow entry. The switch 120 may then regenerate the first flow entry (block 580) (e.g., according to instructions received from the SDN controller 110).

In one embodiment, the switch 120 generates a third flow entry (e.g., explicit tunnel monitoring flow entry) that matches explicit tunnel monitoring packets (e.g., BFD packets) received over the tunnel 210. In one embodiment, the third flow entry has a priority that is higher than the priority of the second flow entry. This allows the switch 120 to handle explicit tunnel monitoring packets without triggering a statistics trigger event message.

Figure 6:
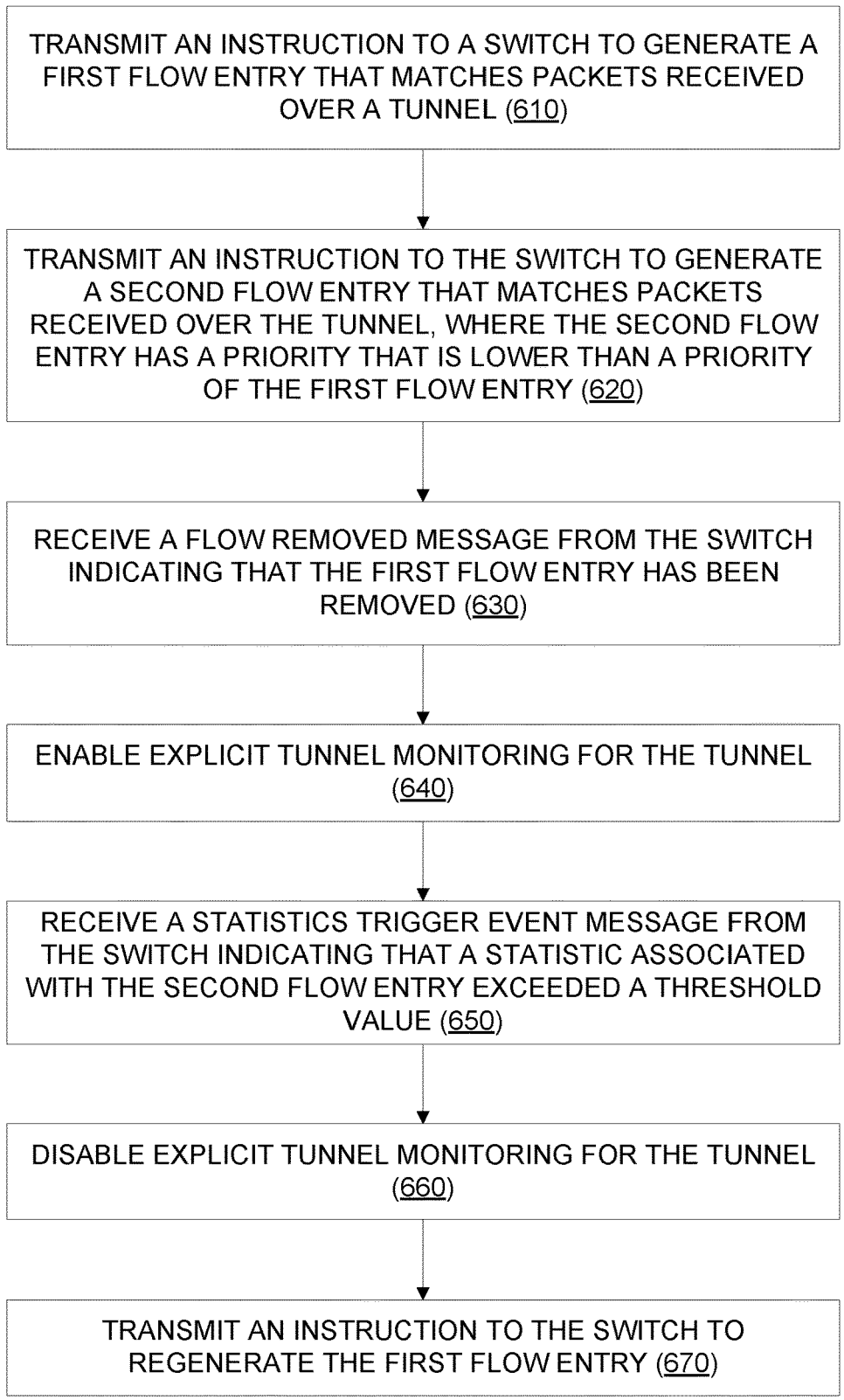
FIG. 6 is a flow diagram of a process for monitoring a tunnel in an SDN network, according to some embodiments.

FIG. 6 is a flow diagram of a process for monitoring a tunnel in an SDN network, according to some embodiments. In one embodiment, the process is performed by an SDN controller 110 in the SDN network 100 (e.g., a network device functioning as an SDN controller 110 in the SDN network 100).

In one embodiment, the process is initiated by the SDN controller 110 transmitting an instruction to a switch 120 to generate a first flow entry that matches packets received over the tunnel 210 (block 610). The SDN controller 110 also transmits an instruction to the switch 120 to generate a second flow entry that matches packets received over the tunnel 210, where the second flow entry has a priority that is lower than a priority of the first flow entry (block 620). In one embodiment, the first flow entry is a failure detect flow entry and the second flow entry is a corresponding recovery detect flow entry. The SDN controller 110 may subsequently receive a flow removed message from the switch 120 indicating that the first flow entry has been removed (block 630). This may indicate that the tunnel 210 has potentially failed. In response, the SDN controller 110 may enable explicit tunnel monitoring for the tunnel 210 (block 640).

Subsequently, the SDN controller 110 may receive a statistics trigger event message from the switch 120 indicating that a statistic associated with the second flow entry exceeded a threshold value (block 650). This may indicate that the tunnel 210 has potentially recovered from failure. In response, the SDN controller 110 may disable explicit tunnel monitoring for the tunnel 210 (block 660) and transmit an instruction to the switch 120 to regenerate the first flow entry (block 670).

An advantage of the embodiments disclosed herein is that they only resort to explicit tunnel monitoring when there is no traffic flowing through the tunnel 210, and thus the bandwidth usage of the tunnel 210 and the processing load at the end points of the tunnel 210 (e.g., switch 120A and switch 120B) can be reduced. This advantage becomes even more pronounced as the number of switches 120 in the data plane increases (since this increases the number of tunnels 210 and thus also increases the number of explicit tunnel monitoring packets needed). Another advantage of the embodiments disclosed herein is that they avoid much of the latency that is typically involved with controller-driven tunnel monitoring, where the packet path of controller→switch-1→switch-2→controller is latency prone. The path from controller→switch-1 and switch-2→controller contributes to a major portion of the latency as these paths lie on the control plane of the network. Other advantages will be apparent to one having ordinary skill in the art from the disclosure provided herein.

Figure 7A:
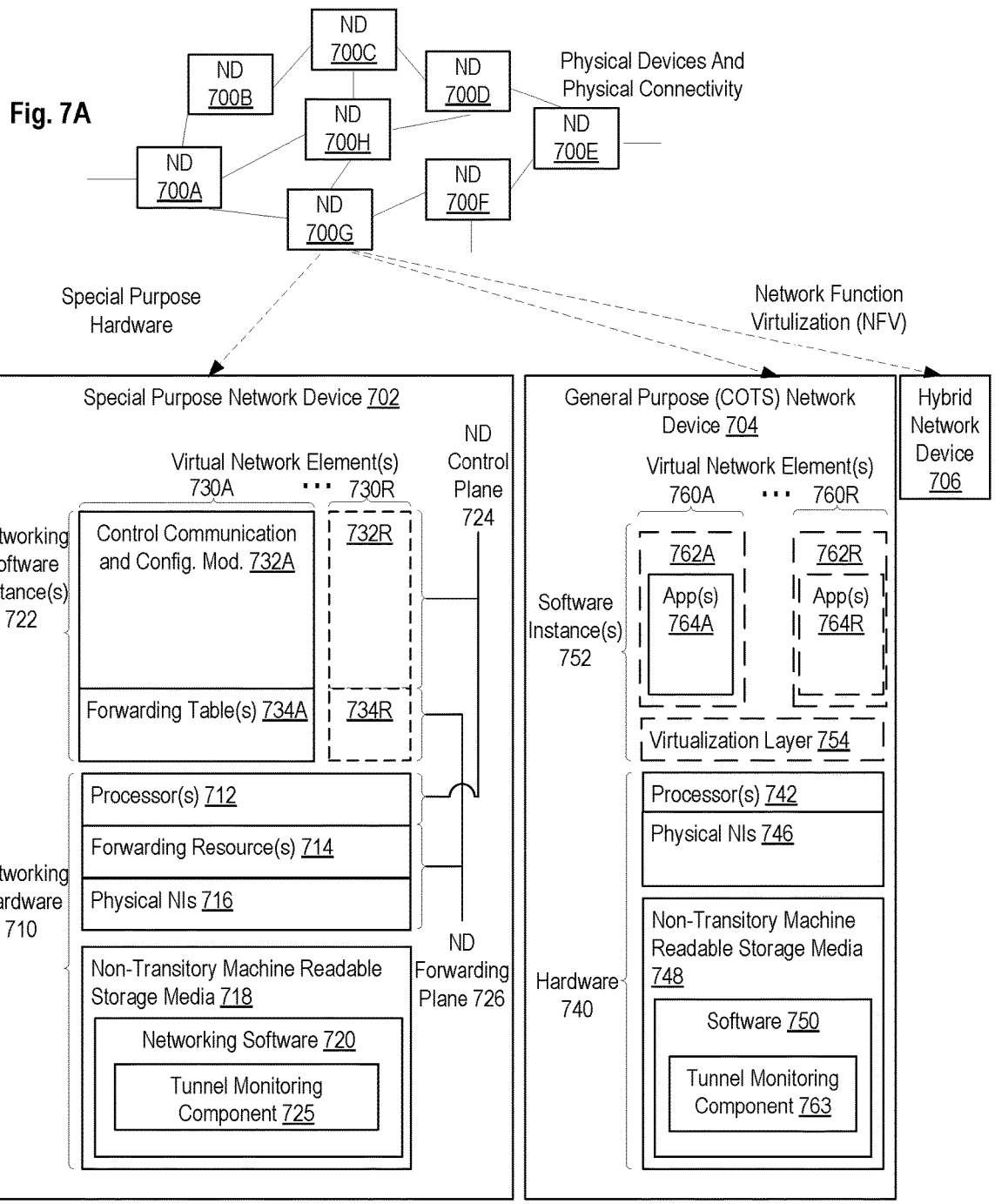
FIG. 7A illustrates connectivity between network devices (NDs) within an exemplary network, as well as three exemplary implementations of the NDs, according to some embodiments.

FIG. 7A illustrates connectivity between network devices (NDs) within an exemplary network, as well as three exemplary implementations of the NDs, according to some embodiments. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

In one embodiment software 720 includes code such as tunnel monitoring component 725, which when executed by networking hardware 710, causes the special-purpose network device 702 to perform operations of one or more embodiments of the present invention as part of networking software instances 722.

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
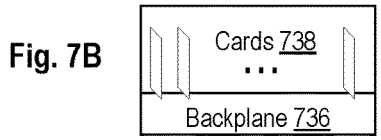
FIG. 7B illustrates an exemplary way to implement a special-purpose network device according to some embodiments.

FIG. 7B illustrates an exemplary way to implement the special-purpose network device 702 according to some embodiments. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

In one embodiment, software 750 includes code such as tunnel monitoring component 763, which when executed by processor(s) 742, cause the general purpose network device 704 to perform operations of one or more embodiments of the present invention as part of software instances 762A-R.

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
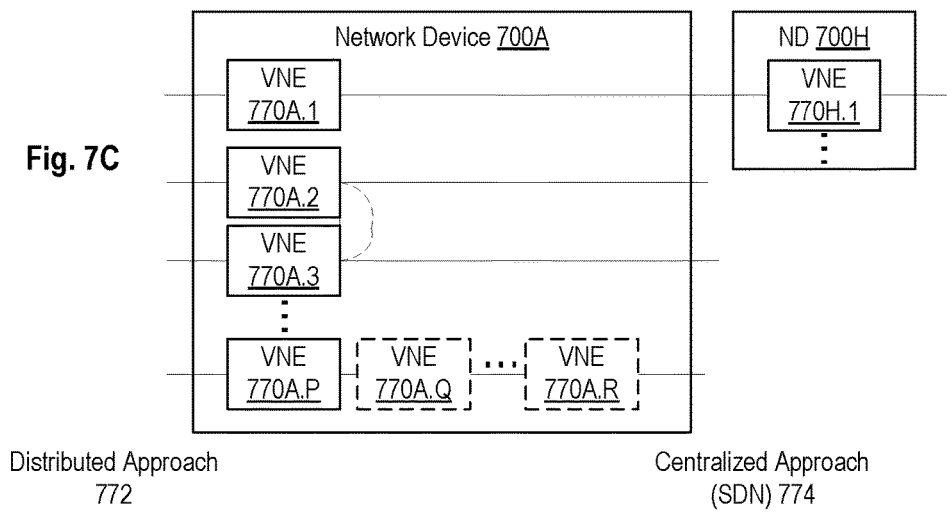
FIG. 7C illustrates various exemplary ways in which virtual network elements (VNEs) may be coupled according to some embodiments.

FIG. 7C illustrates various exemplary ways in which VNEs may be coupled according to some embodiments. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 7D:
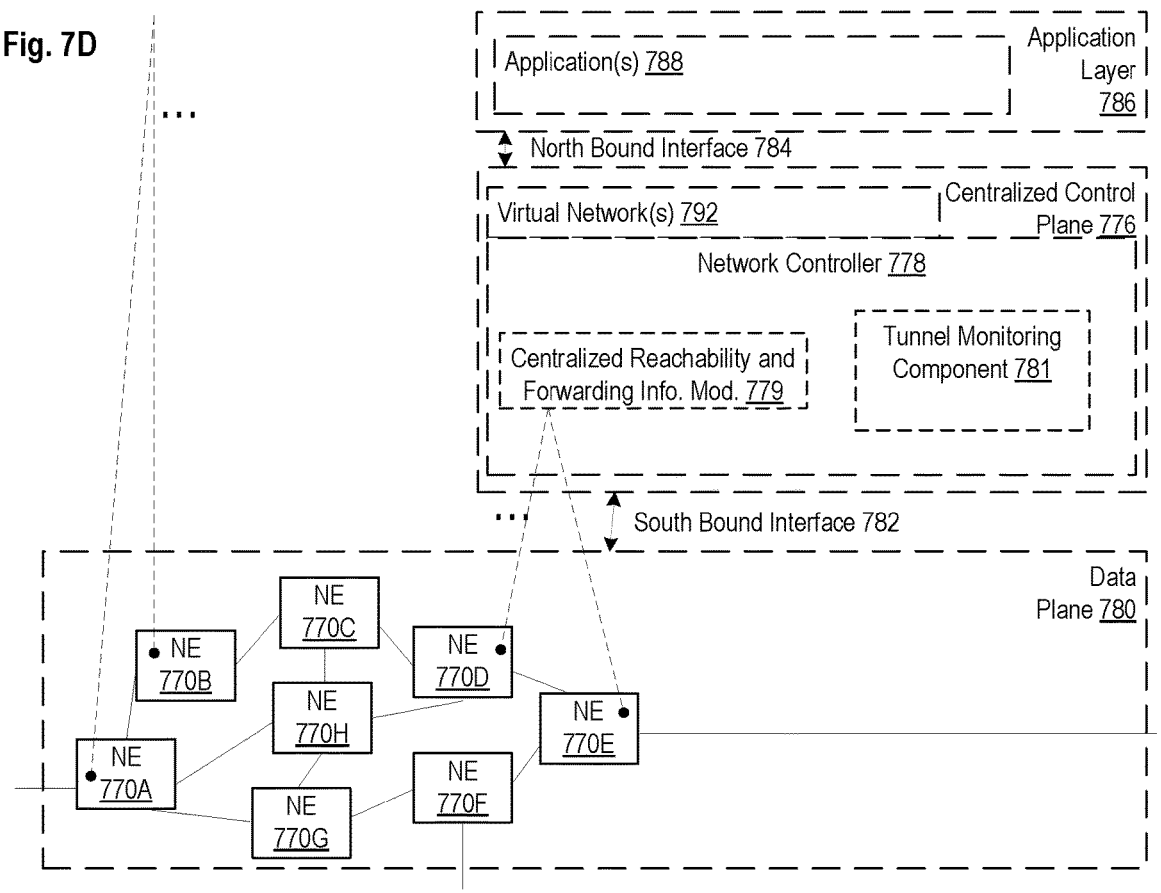
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. In one embodiment, the network controller 778 includes a tunnel monitoring component 781 that when executed by the network controller 778, causes the network controller 778 to perform operations of one or more embodiments of the present invention.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
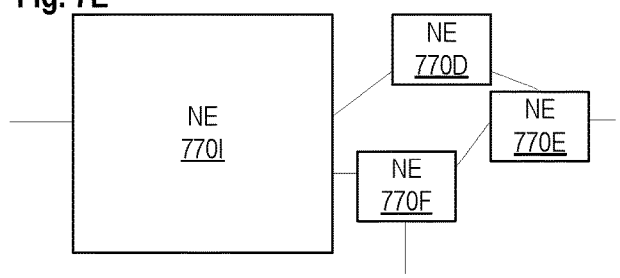
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
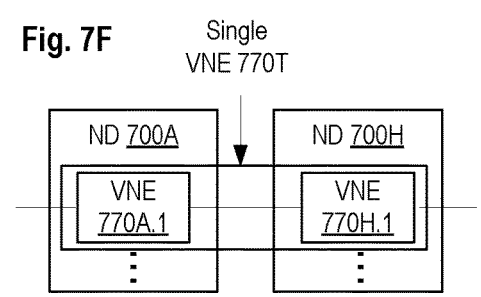
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
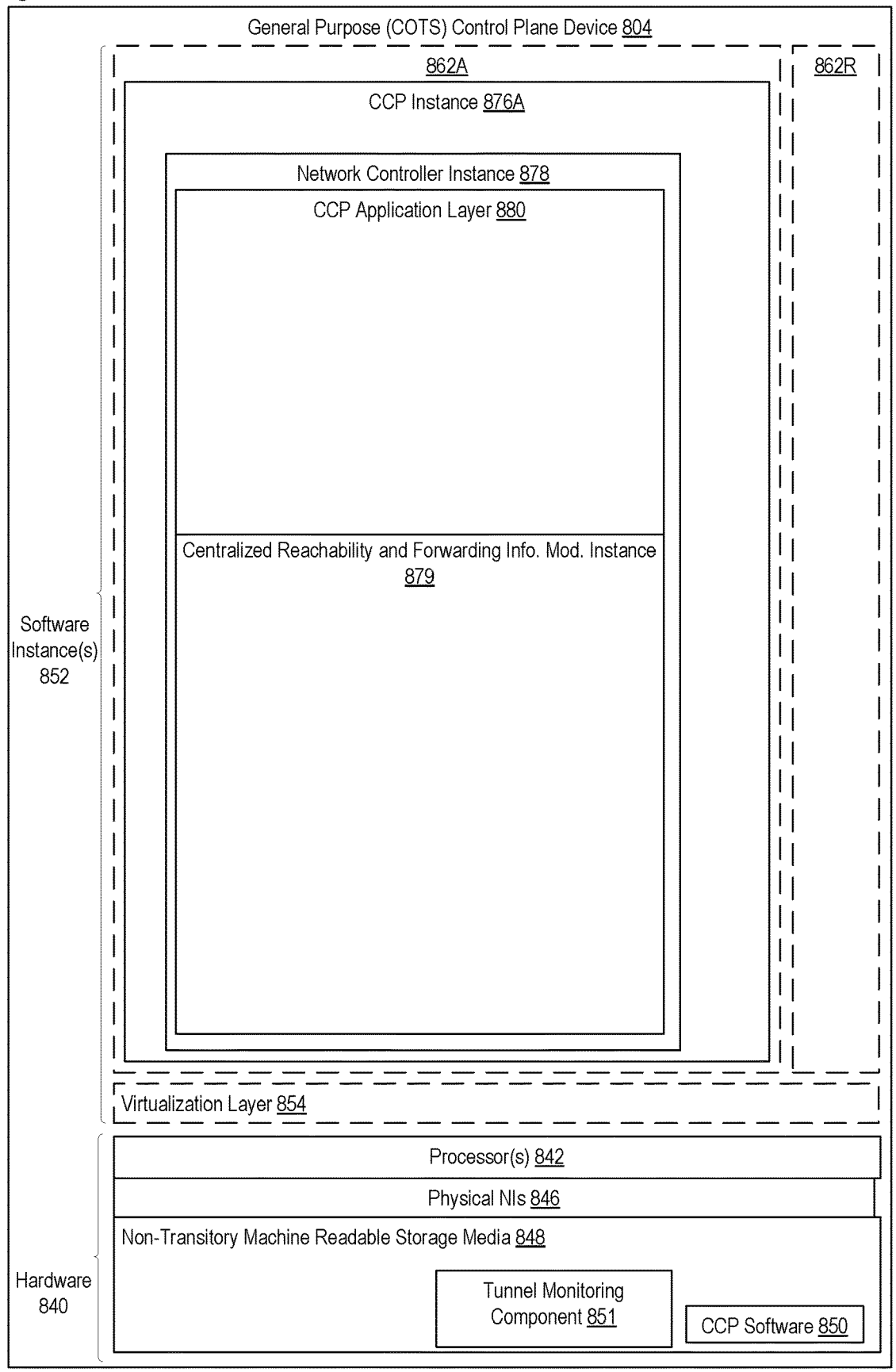
FIG. 8 illustrates a general purpose control plane device with centralized control plane (CCP) software 850), according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850 and a tunnel monitoring component 851.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

The tunnel monitoring component 851 can be executed by hardware 840 to perform operations of one or more embodiments of the present invention as part of software instances 852.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a first switch in a software defined networking (SDN) network to monitor a tunnel between the first switch and a second switch in the SDN network, the method comprising:
   generating a first flow entry that matches packets received over the tunnel;
   generating a second flow entry that matches packets received over the tunnel, wherein the second flow entry has a priority that is lower than a priority of the first flow entry;
   removing the first flow entry and transmitting a flow removed message to an SDN controller in response to a determination that the first flow entry has timed out, wherein transmitting the flow removed message to the SDN controller causes the SDN controller to enable tunnel monitoring for the tunnel;
   maintaining a statistic associated with the second flow entry; and
   transmitting a statistics trigger event message to the SDN controller in response to a determination that the statistic associated with the second flow entry exceeds a threshold value, wherein transmitting the statistics trigger event message to the SDN controller causes the SDN controller to disable tunnel monitoring for the tunnel.

2. The method of claim 1, further comprising:
receiving an instruction from the SDN controller to regenerate the first flow entry after transmitting the statistics trigger event message to the SDN controller; and
regenerating the first flow entry according to the instruction received from the SDN controller.

3. The method of claim 1, wherein the statistic associated with the second flow entry is a packet count of packets that matched the second flow entry.

4. The method of claim 1, further comprising:
generating a third flow entry that matches explicit tunnel monitoring packets received over the tunnel, wherein the third flow entry has a priority that is higher than the priority of the second flow entry.

5. The method of claim 1, wherein the first flow entry and the second flow entry include an instruction to direct matching packets to a tunnel processing pipeline.

6. The method of claim 1, wherein the first flow entry and the second flow entry are generated in a foremost flow table of a packet processing pipeline.

7. The method of claim 1, wherein the first flow entry includes an indication of an idle timeout value.

8. The method of claim 1, wherein the second flow entry includes an indication of the threshold value for the statistic.

9. The method of claim 8, wherein the second flow entry includes an indication that the statistics trigger event message is to be transmitted to the SDN controller when the statistic associated with the second flow entry exceeds a multiple of the threshold value.

10. A network device configured to function as a first switch in a software defined networking (SDN) network to monitor a tunnel between the first switch and a second switch in the SDN network, the network device comprising:
a set of one or more processors; and
a non-transitory machine-readable storage medium having stored therein a tunnel monitoring component, which when executed by the set of one or more processors, causes the network device to generate a first flow entry that matches packets received over the tunnel, generate a second flow entry that matches packets received over the tunnel, wherein the second flow entry has a priority that is lower than a priority of the first flow entry, remove the first flow entry and transmit a flow removed message to an SDN controller in response to a determination that the first flow entry has timed out, wherein transmission of the flow removed message to the SDN controller is to cause the SDN controller to enable tunnel monitoring for the tunnel, maintain a statistic associated with the second flow entry, and transmit a statistics trigger event message to the SDN controller in response to a determination that the statistic associated with the second flow entry exceeds a threshold value, wherein transmission of the statistics trigger event message to the SDN controller is to cause the SDN controller to disable tunnel monitoring for the tunnel.

11. The network device of claim 10, wherein the tunnel monitoring component, when executed by the set of one or more processors, further causes the network device to receive an instruction from the SDN controller to regenerate the first flow entry after transmitting the statistics trigger event message to the SDN controller and regenerate the first flow entry according to the instruction received from the SDN controller.

12. The network device of claim 10, wherein the statistic associated with the second flow entry is a packet count of packets that matched the second flow entry.

13. A non-transitory machine-readable medium having computer code stored therein, which when executed by a set of one or more processors of a network device functioning as a first switch in a software defined networking (SDN) network, causes the network device to perform operations for monitoring a tunnel between the first switch and a second switch in the SDN network, the operations comprising:
generating a first flow entry that matches packets received over the tunnel;
generating a second flow entry that matches packets received over the tunnel, wherein the second flow entry has a priority that is lower than a priority of the first flow entry;
removing the first flow entry and transmitting a flow removed message to an SDN controller in response to a determination that the first flow entry has timed out, wherein transmitting the flow removed message to the SDN controller causes the SDN controller to enable tunnel monitoring for the tunnel;
maintaining a statistic associated with the second flow entry; and
transmitting a statistics trigger event message to the SDN controller in response to a determination that a statistic associated with the second flow entry exceeds a threshold value, wherein transmitting the statistics trigger event message to the SDN controller causes the SDN controller to disable tunnel monitoring for the tunnel.

14. The non-transitory machine-readable medium of claim 13, wherein the computer code, when executed by the set of one or more processors of the network device, causes the network device to perform further operations comprising:
receiving an instruction from the SDN controller to regenerate the first flow entry after transmitting the statistics trigger event message to the SDN controller; and
regenerating the first flow entry according to the instruction received from the SDN controller.

15. The non-transitory machine-readable medium of claim 13, wherein the statistic associated with the second flow entry is a packet count of packets that matched the second flow entry.

16. The non-transitory machine-readable medium of claim 13, wherein the computer code, when executed by the set of one or more processors of the network device, causes the network device to perform further operations comprising:
generating a third flow entry that matches explicit tunnel monitoring packets received over the tunnel, wherein the third flow entry has a priority that is higher than the priority of the second flow entry.

* * * * *